July 29, 1969          K. HOFMANN          3,458,143

FEEDING DEVICE

Filed June 22, 1965          3 Sheets-Sheet 3

Inventor:
Karl Hofmann
By: Spencer & Kaye
Attorneys

United States Patent Office 3,458,143
Patented July 29, 1969

3,458,143
FEEDING DEVICE
Karl Hofmann, Heldenberger, Kreis, Hanau, Germany, assignor to Condux-Werk Herbert A. Merges K.G., Wolfgang, near Hanau, Germany
Continuation-in-part of application Ser. No. 465,480, June 21, 1965. This application June 22, 1965, Ser. No. 466,011
Claims priority, application Germany, Feb. 25, 1965, C 34,630
Int. Cl. B02c *13/06*
U.S. Cl. 241—186
9 Claims

ABSTRACT OF THE DISCLOSURE

In a cutting mill arrangement for cutting up plastic tubes of long lengths and having a horizontal shaft driving a rotor having blades fixed thereto and arranged within a housing, a horizontally arranged feeding mechanism for feeding the tubes, and clamping mechanisms provided with pressure rollers and tube retraction preventers in the form of at least one loosely hinged ratchet member which permits the tubes to move freely in the forward direction while automatically preventing retraction movement of the tubes, the ratchet member being disposed opposite the feeding mechanism so as to constantly contact the tubes.

Cross reference to related application

This application is a contniuation-in-part of application Ser. No. 465,480, filed on June 21, 1965, now abandoned.

The present invention relates generally to the cutting art, and more particularly, to a cutting mill for cutting up long plastic tubes, and which is connected with a horizontal feeding mechanism.

Cutting up low quality or scrap pieces which inevitably accumulate during the production of plastic tubes and having lengths of about six meters, has previously been difficult because of space as well as technical difficulties.

Previously special feeding funnels having guides for the tubes have been produced for cutting up such tubes in cutting mills. However, the tubes can only be fed into such funnels approximately vertically and by their own weight. As a practical matter, it is hardly possible to do this because of the space which the tubes require, and therefore the tubes have to be cut up even before they can be fed into the special funnel.

With this in mind, it is a main object of the present invention to eliminate the necessity for the uneconomical preparatory work in cutting up scrap plastic tubes.

Another object of the invention is to provide a relatively simple arrangement for cutting up scrap plastic tubes which eliminates the previously necessary transportation of tubes and multiple step cutting up of the tubes.

These objects and others ancillary thereto are accomplished in accordance with preferred embodiments of the invention wherein a cutting mill is provided having a horizontal shaft provided with fixed blades mounted on a rotating member. A feeding device is connected with this rotating cutting shaft. The feeding device can feed plastic tubes of any length. A conveyor is provided for pulling the tubes into the cutting region which, is described, is actually a cutting circle. Pressure devices are provided above the conveyor and in the feeding device. These include rollers having spring biased bearings and which engage the tube and rotate as the tube is moved by the driving conveyor.

The pressure rollers can be externally adjusted by means of adjusting spindles so that it is possible to process tubes of differing diameters. Toothed clamping mechanisms are provided between the rollers. These mechanisms are curved and are adjustable. During the feeding movement of the tubes into the cutting device, the clamping mechanisms are slightly lifted because of the forward movement of the tube and the tube glides along under the surface of the clamping mechanism. However, retraction of the tube because of impacts of the cutting rotor or other influences is prevented by the clamping mechanism. The reason for this is that the mechanism upon an initial retracting movement of the tube, acts as a ratchet or stop pawl as soon as the tube moves and thus prevents the tube from retracting.

Additional objects and advantages of the present invention will become apparent upon consideration of the following description when taken in conjunction with the accompanying drawings in which:

FIGURE 2b is a longitudinal sectional view of the embodiment of FIGURE 2a.

FIGURE 3b is a longitudinal sectional view of the embodiment of FIGURE 3a.

Figure 1:
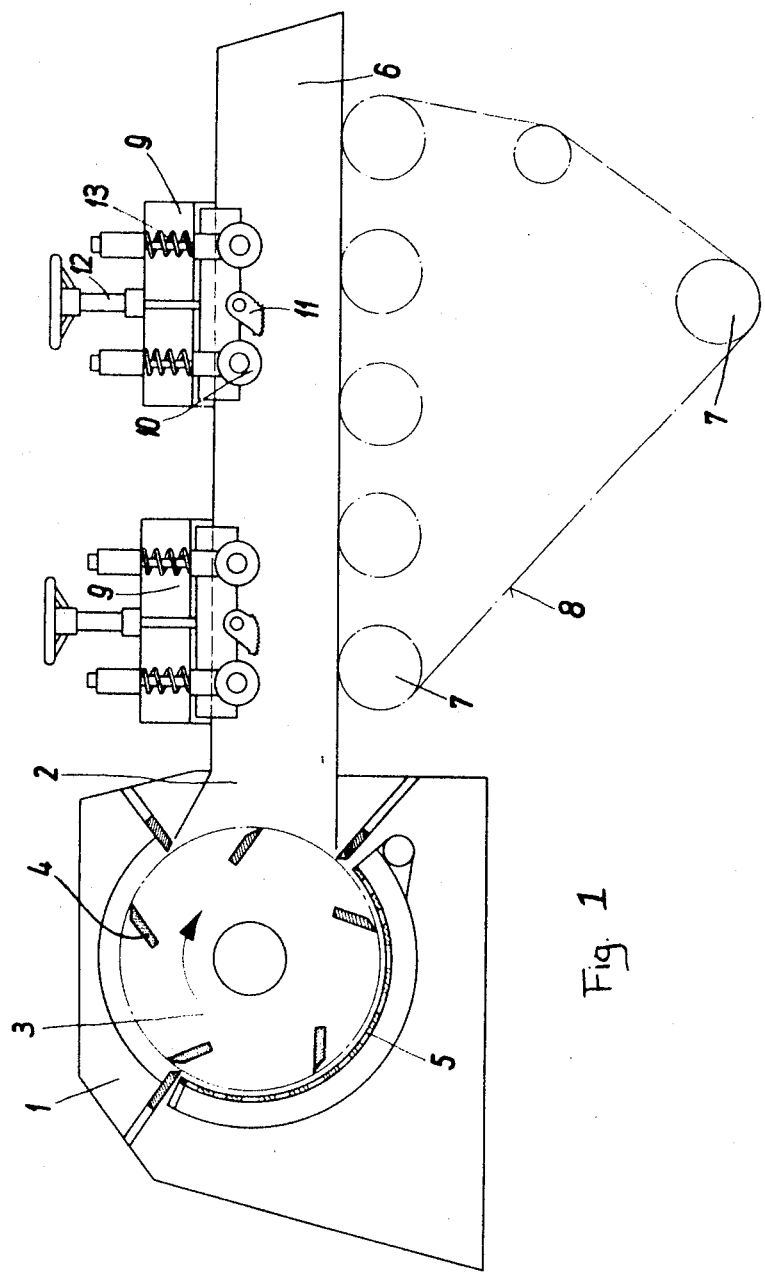
FIGURE 1 is a schematic view of the present invention.

With more particular reference to the drawings, FIGURE 1 shows the present invention wherein a feeding device 6 is provided which is connected with a cutting mill 1. The cutting mill is provided with a lateral feeding opening 2 which is aligned with the feeding device. A cutting rotor 3 is provided having blades 4 fixed thereto and a sieve 5 is provided beneath the rotating cutting member. The feeding device is provided on its lower side with a driving member which includes a conveyor 8 running over the wheels 7 which drive the conveyor.

The conveyor 8 can be in the form of a conveyor chain in which event the wheels 7 would be sprocket wheels for driving the chain. However, an actual chain need not be used since a band of plastic or rubber could be used. The conveyor is preferably endless. When it is in the form of a chain, it includes individual elements, such as links which are connected to each other and have a frictional upper surface to increase the force with which they carry along objects on their transporting surfaces. This can include teeth, or cushions or pads made of rubber or plastic. The conveyor can also be made of individual elements the entire surface of which is provided with a continuous rubber or plastic layer.

Figure 4A:
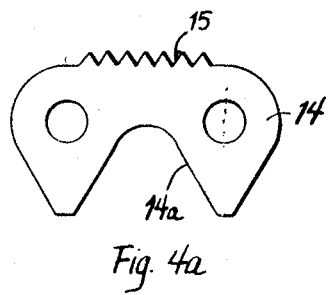
FIGURE 4a is a side elevational view of a sprocket link that can be used to form the conveyor.
Figure 4B:
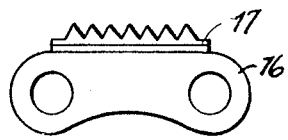
FIGURE 4b is a side elevational view of a roller link which can be used in constructing the conveyor.

With more particular reference to FIGURES 4, FIGURE 4a illustrates a sprocket chain link 14 which is toothed at 15 on its upper surface and is arranged to have a recess 14a so that it can be used with sprocket wheels. FIGURE 4b shows a chain link 16 for use in a roller chain arrangement and having a toothed element 17 attached to the upper surface thereof. Thus, in this arrangement, a chain element includes two pieces while that of FIGURE 4a is a single piece, and the teeth 15 are formed in the upper surface thereof.

Figure 5A:
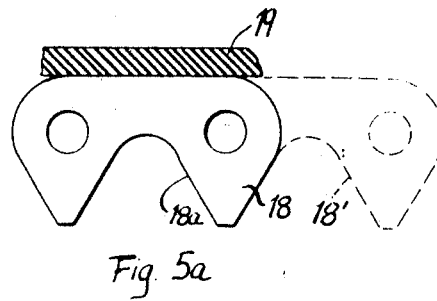
FIGURE 5a is a side elevational view of a sprocket link which can be used for constructing the conveyor when a pad is desired.

With more particular reference to FIGURES 5, FIGURE 5a shows a link 18 having a recess 18a so that it can be used with a ratchet wheel. A chain so constructed has its entire upper surface provided with a continuous uninterrupted rubber or plastic surface 19. A second link 18' is shown in dashed lines as being attached to the link 18.

Figure 5B:
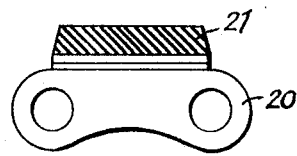
FIGURE 5b is a side elevational view of a roller link which can be used for constructing the conveyor when a pad is desired.

FIGURE 5b shows a link 20 for a roller chain provided with a pad 21 constructed of rubber or plastic.

Figure 6:
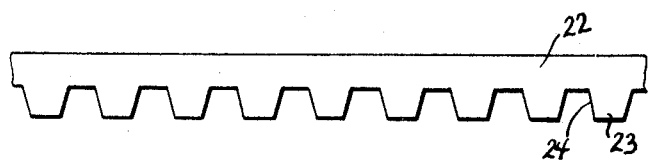
FIGURE 6 is a side elevational view of an endless band type of conveyor.

FIGURE 6 shows a portion of an endless belt 22 which is provided with teeth 23 forming grooves or recesses 24 which can cooperate with drive means 7 which would then be in the form of a sprocket wheel.

As shown in FIGURE 1, in the upper portion of the feeding device 6 clamping mechanisms 9 are provided and include rolls 10 which engage the tube and rotate as the tube moves toward the cutting device.

The actual clamping elements (11) themselves are disposed between the rollers 10 and as can be seen the clamping elements are designed and operate as stop pawls. Thus, the link-like clamping elements 11 are loosely hinged at one end and because of gravity have their other end normally disposed in the feed opening. However, as a plastic tube is being carried by the feeding device 8 toward the cutting device, the clamping elements 11 pivot upwardly and due to the force of gravity engage the tops of the plastic tubes which slide beneath them. Upon a retracting movement of the plastic tubes, it can be seen that the pawl elements 11 will be moved in a counter-clockwise direction and thus clamp and prevent the tubes from being retracted. As the feeding device 8 continues to move, it can subsequently carry the tube forwardly again.

The feeding device 8 pulls a tube into the cutting circle of the cutting mill because of the frictional force between the upper surface of the transporting element 8 and the tube which lies on the surface or this endless band and which is to be pulled into the cutting mill. In order to assure that there is positive feeding a force is provided for engaging the tube against the transport or conveyor belt. This is accomplished by using the pressure rollers 10 by means of which the tube is pressed downwardly against the transport means 8 thereby to feed the tubes into the cutter mill.

The height of the clamping means as well as the height of the pressure rollers thereof can be adjusted by spindle 12 which, as it is screwed downwardly, moves the rollers 10 downwardly against the tubes. Rollers 10 are biased downwardly by springs 13.

Figure 2A:
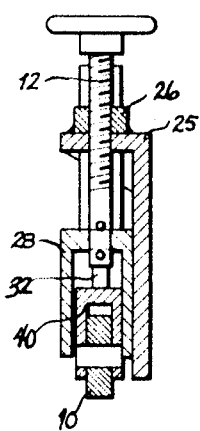
FIGURE 2a is a transverse sectional view, taken along the line 2—2 of FIGURE 2b, of one embodiment of the clamping mechanism.
Figure 2B:
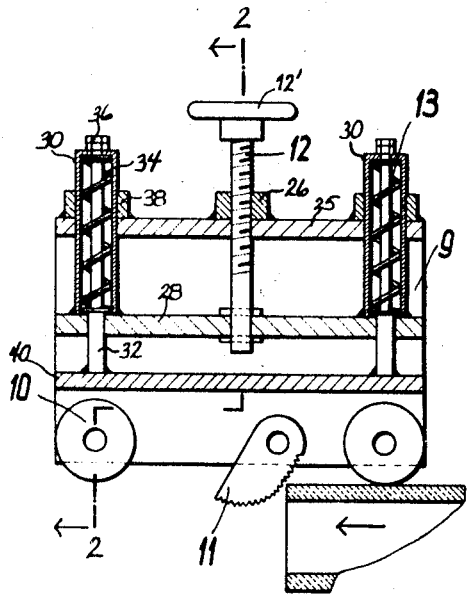

With more particular reference to FIGURES 2, an arrangement for the clamping mechanisms 9 is illustrated wherein a fixed member 25 is provided on which is mounted a threaded collar 26 in which spindle 12 is threadedly mounted. The support 25 need not actually be fixedly mounted to the machine frame or the like but can in turn, if desired, be adjustable. However, insofar as the clamping mechanism 9 is concerned this support 25 can be considered stationary. The lower end of the spindle is connected to a movable housing 28 with which the ratchet or retraction-preventing elements 11 as well as the rollers 10 are movable. Both the rollers 10 and element 11 are mounted for free movement about their respective pivot points. Thus, turning spindle 12 by means of its handle 12' axially moves the spindle with respect to collar 26 and support 25. This also moves the rollers 10 and clamping elements 11 upwardly and downwardly respectively as a unit.

The movable housing 28 is provided on its upper surface with hollow tubular elements 30. Spring rods 32 are disposed interiorly of these tubes and springs 34 are mounted within the tubes about rods 32. Nuts 36 are threaded on the ends of rods 32 for retaining the rods 32 in place. The tubes 30 pass through and are axially movable with respect to collars 38 which are mounted on the fixed support 25.

A spring-mounted housing 40 is connected to the lower ends of rods 32, and the rollers 10 and the retraction-preventing element 11 are pivotally mounted to housing 40.

It can thus be seen that the rollers 10 are freely rotatable in the housing 40 and the clamping element 11 is freely pivotable. The spindle 12 can be threaded downwardly so that the rollers 10 engage a tube to be fed and apply downward pressure through the medium of the spring 34. The housing 40 to which elements 10 and 11 are actually mounted is spring-biased with respect to movable housing 28 which is directly adjustable by the spindle 12. Thus, the housing 40 is indirectly adjustable by means of spindle 12, via the spring arrangement.

Figure 3A:
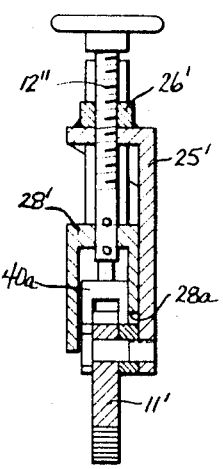
FIGURE 3a is a transverse sectional view, taken along the line 3—3 of FIGURE 3b, of a further embodiment of a clamping mechanism.
Figure 3B:
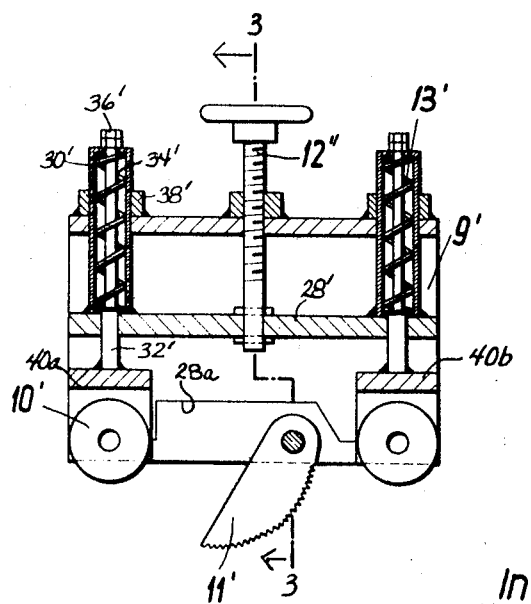

With more particular reference to FIGURES 3, an arrangement can be seen wherein a fixed support 25' is provided on which a threaded collar 26' is mounted. Elements in FIGURES 3 which are similar to those of FIGURE 2 are provided with corresponding reference numerals but with primes added. The spring arrangement is similar to that of FIGURES 2. However, in the embodiment of FIGURES 3, two spring-mounted housings 40a and 40b are provided which are comparable to housing 40 of FIGURES 2. Furthermore, there is a cutout 28a provided in the two vertical walls of housing 28' and the clamping element 11', instead of being mounted to one of the housings 40a or 40b, is actually mounted to the vertical wall of fixed support 25'.

Thus, when the spindle 12" is adjusted, it can be seen that only the rollers 10' will be moved upwardly and downwardly but that the link 11' which is mounted to fixed support 25' will not move with the rollers 10' but will only be moved upwardly and downwardly if the separate support 25' is itself moved.

It will be understood that the above description of the present invention is susceptible to various modifications, changes, and adaptations, and the same are intended to be comprehended within the meaning and range of equivalents of the appended claims.

What is claimed is:

1. In a cutting mill arrangement for cutting up plastic tubes of long length and having a horizontal shaft driving a rotor having blades fixed thereto and arranged within a housing the improvement comprising, in combination: a cutting mill housing in which the rotor is disposed and provided with a lateral feed opening disposed transversely to the axis of rotor rotation; and a horizontally arranged feeding mechanism having an endless conveyor chain for feeding tubes in a direction transverse to the axis of rotor rotation, such feeding mechanism being aligned with said lateral feed opening of the housing; and clamping mechanisms provided with pressure rollers and tube retraction preventers.

2. For use in a cutting mill arrangement for cutting up plastic tubes of long length, which arrangement has a horizontal shaft driving a rotor having blades fixed thereto, a device, comprising, in combination:
a cutting mill housing in which the rotor is disposed, said housing having a lateral feed opening; and
horizontally arranged feeding means aligned with said lateral feed opening for feeding tubes to the rotor, said feeding means including
endless conveyor means for feeding tubes, and
clamping means for preventing retraction of the tubes and including pressure rollers and at least one retraction preventing element disposed between every two pressure rollers and arranged to act as a ratchet whereby the tubes can only move in the forward direction.

3. A device as defined in claim 2 comprising means including spindles for adjusting the pressure of the rollers against the tubes being fed through the feeding means.

4. A device as defined in claim 3 wherein said retraction preventing elements are curved and provided with externally toothed surfaces and arranged for being adjusted together with such pressure rollers by means of the spindles.

5. A device as defined in claim 2 wherein means are provided for adjusting the pressure rollers independently of the retraction preventing elements.

6. A device for feeding articles to a cutter apparatus comprising, in combination:

horizontally disposed feeding means for feeding articles to a cutter apparatus; and retraction preventing means arranged adjacent, and opposite, said feeding means for preventing retraction of such articles when they engage the cutter, said retraction preventing means being mounted for applying a friction holding force to such articles only in response to a retraction movement thereof and constantly contacting such articles as they are fed by the feeding means to a cutter apparatus, said retraction preventing means including rollers which are caused to rotate by being in constant contact with the articles which are fed.

7. A device as defined in claim 6 wherein said retraction preventing means further include loosely hinged toothed links.

8. A device as defined in claim 6 comprising means for biasing the rollers toward the feeding means for urging articles being fed into contact with the feeding means.

9. A device as defined in claim 8 wherein said retraction preventing means include loosely hinged toothed links arranged to normally rest lightly on articles being fed but jamming such articles against the feeding means upon a retracting movement of such articles.

References Cited

UNITED STATES PATENTS

| | | | |
|---|---|---|---|
| 3,126,138 | 3/1964 | Onulak | 226—151 |
| 3,186,278 | 6/1965 | Palmleaf | 83—422 X |

ROBERT C. RIORDON, Primary Examiner

J. F. McKEOWN, Assistant Examiner

UNITED STATES PATENT OFFICE

CERTIFICATE OF CORRECTION

Patent No. 3,458,143     Dated July 29th, 1969

Karl Hofmann

It is certified that error appears in the above-identified patent and that said Letters Patent are hereby corrected as shown below:

In the heading of the patent, line 3, change "Heldenberger, Kreis, Hanau," to --Heldenbergen, Kreis Hanau,--.

Column 1, line 65, change "which,is" to --which, as--.

SIGNED AND
SEALED
MAR 24 1970

(SEAL)
Attest:

Edward M. Fletcher, Jr.
Attesting Officer

WILLIAM E. SCHUYLER, JR.
Commissioner of Patents